(12) United States Patent
Baumgartner et al.

(10) Patent No.: US 7,828,529 B2
(45) Date of Patent: Nov. 9, 2010

(54) REGULATABLE DRIVE FOR A MOTOR VEHICLE COMPONENT

(75) Inventors: Roland Baumgartner, Vaihingen (DE); Ralf Maus, Korntal-Münchingen (DE); Gerold Schultheiss, Pforzheim (DE)

(73) Assignee: Behr GmbH & Co. KG, Stuttgart (DE)

( * ) Notice: Subject to any disclaimer, the term of this patent is extended or adjusted under 35 U.S.C. 154(b) by 1043 days.

(21) Appl. No.: 11/062,754

(22) Filed: Feb. 23, 2005

(65) Prior Publication Data

US 2005/0196297 A1 Sep. 8, 2005

(30) Foreign Application Priority Data

Feb. 23, 2004 (DE) .................. 10 2004 009 073

(51) Int. Cl.
*F04B 49/00* (2006.01)
*F04B 17/00* (2006.01)

(52) U.S. Cl. .................. 417/223; 417/362; 417/364

(58) Field of Classification Search .............. 192/58.8, 192/58.61; 417/423.1, 362, 364, 374, 223, 417/316

See application file for complete search history.

(56) References Cited

U.S. PATENT DOCUMENTS

| 4,228,880 | A | * | 10/1980 | Gee ...................... | 192/58.61 |
|---|---|---|---|---|---|
| 4,265,348 | A | * | 5/1981 | Clarke .................... | 192/58.61 |
| 4,320,723 | A |   | 3/1982 | Wendling et al. | |
| 4,362,226 | A | * | 12/1982 | Gee ...................... | 192/58.61 |
| 4,556,138 | A | * | 12/1985 | Martin et al. ............ | 192/58.61 |
| 4,893,703 | A | * | 1/1990 | Kennedy et al. ......... | 192/58.61 |
| 4,987,986 | A | * | 1/1991 | Kennedy et al. ......... | 192/58.61 |
| 4,995,494 | A | * | 2/1991 | Kennedy et al. .......... | 192/58.8 |
| 5,415,259 | A | * | 5/1995 | Martin .................... | 192/58.2 |
| 5,555,963 | A | * | 9/1996 | Martin .................... | 192/58.61 |
| 5,722,523 | A | * | 3/1998 | Martin .................... | 192/58.61 |
| 6,007,303 | A |   | 12/1999 | Schmidt | |
| 6,026,943 | A | * | 2/2000 | Fuchs et al. .............. | 192/58.61 |
| 6,032,775 | A | * | 3/2000 | Martin .................... | 192/58.61 |
| 6,363,918 | B2 | * | 4/2002 | H.ang.kansson et al. .... | 123/509 |
| 6,419,064 | B1 |   | 7/2002 | Krammer | |
| 6,548,929 | B2 | * | 4/2003 | Nelson et al. ............... | 310/105 |
| 6,561,770 | B2 | * | 5/2003 | Okuda ........................ | 417/223 |
| 6,725,812 | B1 | * | 4/2004 | Scott ........................ | 123/41.44 |

(Continued)

FOREIGN PATENT DOCUMENTS

DE 91 03 493.0 U1 8/1991

(Continued)

*Primary Examiner*—Charles G Freay
*Assistant Examiner*—Alexander B Comley
(74) *Attorney, Agent, or Firm*—Foley & Lardner LLP

(57) ABSTRACT

A regulatable drive for a motor vehicle, in particular for a water pump in a motor vehicle, has a rotatably mounted shaft, on which is located a rotatably mounted drive member and a rotationally fixed driven member. Between the drive member and driven member, a coupling region is defined, which can receive a viscous fluid for selectively coupling the drive member and driven member. The regulatable drive includes at least one first and at least one second flow path, which connect a fluid storage space to the coupling region, and it has a device which can be varied in its position by means of at least one actuator and which varies at least one passage orifice of at least one of the flow paths.

17 Claims, 6 Drawing Sheets

U.S. PATENT DOCUMENTS

| | | | |
|---|---|---|---|
| 6,752,251 B2 * | 6/2004 | May et al. ................ | 192/58.61 |
| 6,935,478 B2 | 8/2005 | Dräger et al. | |
| 7,191,883 B2 * | 3/2007 | Angermaier ............. | 192/58.61 |
| 2002/0012593 A1 | 1/2002 | Okuda | |
| 2004/0124057 A1 * | 7/2004 | Shiozaki et al. .......... | 192/58.61 |
| 2004/0168877 A1 | 9/2004 | Drager et al. | |
| 2005/0029069 A1 * | 2/2005 | Angermaier ............. | 192/58.61 |

FOREIGN PATENT DOCUMENTS

| | | |
|---|---|---|
| DE | 40 37 265 A1 | 5/1992 |
| DE | 42 05 523 A1 | 8/1993 |
| DE | 196 00 735 A1 | 7/1997 |
| DE | 197 01 993 A1 | 7/1998 |
| DE | 197 46 359 C2 | 7/1998 |
| DE | 198 10 296 A1 | 9/1999 |
| DE | 199 32 359 A1 | 2/2000 |
| DE | 199 40 099 A1 | 3/2001 |
| DE | 199 40 537 A1 | 3/2001 |
| DE | 102 38 739.7 | 8/2002 |
| EP | 0 232 995 A1 | 8/1987 |
| EP | 0 293 102 A1 | 11/1988 |
| EP | 0 562 226 A1 | 9/1993 |
| EP | 1 120 578 A2 | 8/2001 |
| EP | 1 353 051 A2 | 10/2003 |
| EP | 1 391 624 A1 | 2/2004 |
| JP | 04-258530 A | 9/1992 |
| WO | WO 01/14759 A1 | 3/2001 |

* cited by examiner

REGULATABLE DRIVE FOR A MOTOR VEHICLE COMPONENT

CROSS-REFERENCE TO RELATED PATENT APPLICATIONS

The right of priority under 35 U.S.C. §119(a) is claimed based on Federal Republic of Germany Patent Application 10 2004 009 073.4, filed Feb. 23, 2004, including the entire disclosure of which, including the specification, drawings, claims and abstract, is incorporated herein by reference.

BACKGROUND OF THE INVENTION

The present invention relates to a regulatable drive for a motor vehicle component, in particular for a water pump in a motor vehicle.

Regulatable drives for use in a motor vehicle are known and serve, for example, for regulating the water pump rotational speed in order to regulate the volume flow of the cooling medium for an internal combustion engine as a function of the heat energy to be discharged. The couplings used in the prior art present the problem, inter alia, that a reliable rotational speed setting is problematic because of the difficult torque transmission or the regulating range is relatively small. This does not permit an economically appropriate use in a motor vehicle, in particular for vehicles employing an internal combustion engine.

Furthermore, in known prior art drives, the output rotational speed is regulated as a function of the degree of filling of a coupling with shearing fluid, creating, inter alia, the risk of an uncontrolled standstill of the drive in the case of a decreasing oil quantity. The result of this, for example, in the drive of a water pump in a motor vehicle, is that the heat generated by the internal combustion engine is not discharged sufficiently and there is the risk of engine overheating.

There are also similar disadvantages in what are known as hysteresis couplings which, however, additionally have problems of regulation in low torque ranges, so that, here too, there is the risk that an uncontrolled standstill of the coupling drive may occur.

SUMMARY OF THE INVENTION

One object of the present invention is therefore to provide an improved regulatable drive for use especially in a motor vehicle.

A particular object of the present invention is, therefore, to provide a regulatable drive for use in a motor vehicle which avoids or at least reduces the disadvantages known in the prior art and, because of an improved regulation of the rotational speed of the driven assembly, such as, for example, a water pump, improves the operation of an internal combustion engine.

In accordance with one aspect of the present invention, there has been provided a regulatable drive suitable for driving a water pump in a motor vehicle, comprising: a rotatably mounted shaft; a driven member mounted rotationally fixedly on the shaft; a drive member mounted rotatably on the shaft, with the drive member and driven member defining therebetween a coupling region for receiving a viscous fluid; at least one first and at least one second flow path connecting a fluid storage space to the coupling region; and a selectively actuatable device for varying at least one passage orifice of at least one of the flow paths.

In accordance with another aspect of the invention, there is provided an apparatus for operating a cooling system of a motor vehicle, comprising at least one coolant pump and a drive assembly therefor, wherein the drive assembly comprises a drive as defined above.

In accordance with still another aspect of the invention, there is provided a method for operating a cooling system for a motor vehicle, comprising driving a water pump with a drive as defined above.

Further objects, features and advantages of the present invention will become apparent from the detailed description of preferred embodiments that follows, when considered together with the accompanying figures of drawing.

DETAILED DESCRIPTION OF PREFERRED EMBODIMENTS

Figure 1:
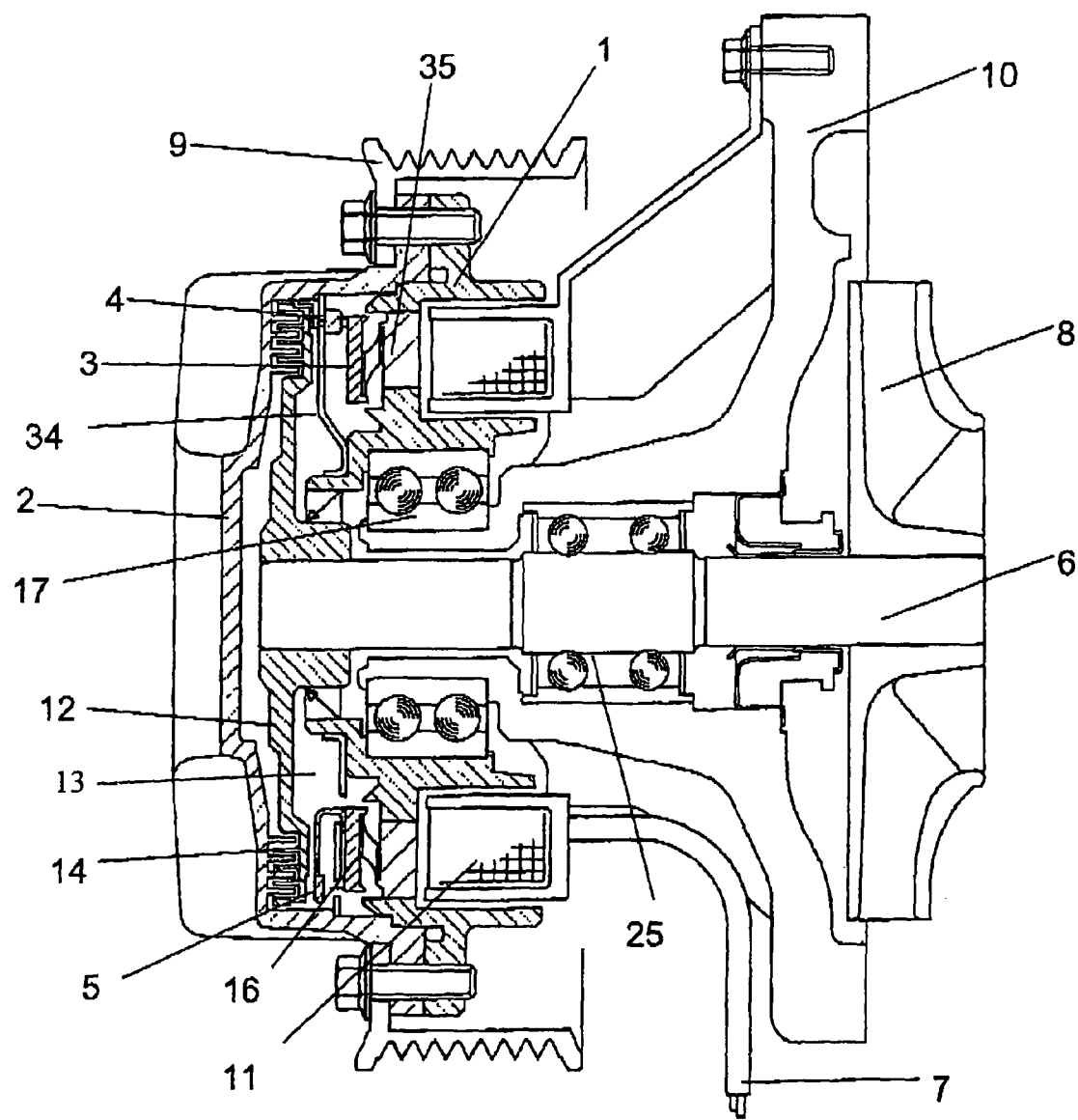
FIG. 1 is a cross-sectional illustration of the drive according to the invention showing a water pump in a first switching position.

The regulatable drive according to the invention is particularly suitable for use in a motor vehicle, in particular for a water pump in a motor vehicle. It has a rotatably mounted shaft on which at least one driven member is mounted in a rotationally fixed manner and at least one drive member rotatably mounted thereon. Between the drive member and the driven member is defined a coupling region which can receive a viscous fluid. The regulatable drive comprises at least one first and at least one second flow path, which connect a fluid storage space to the coupling region between the drive member and driven member. The regulatable drive further includes a device which can be varied in its position by means of at least one actuator and which varies at least one passage orifice of at least one flow path of the drive.

The term "drive member" is understood, according to the present invention, to mean at least partially profiled disks which are mounted rotatably or fixedly in terms of rotation on a shaft and are used, in particular, for the transmission of a predetermined torque.

The term "driven member" is likewise understood to mean at least partially profiled disks which co-operate with at least one drive member in such a way that a predetermined torque is transmitted directly or indirectly from the drive member to the driven member.

The term "flow path" is used, according to the present invention, for regions of the regulatable drive through at least a part of which a viscous fluid flows.

According to a particularly preferred embodiment, the drive for a coolant pump has, in particular, a coupling region which is formed essentially by concentric profile structures engaging one in the other, on at least one side of the drive member and driven member in each case. The drive member and driven member can be coupled by means of this coupling region for the transmission of, in particular, a predetermined torque.

According to a further particularly preferred embodiment, the drive for a coolant pump has at least one actuatable device which, in particular, is controlled by means of a magnetic field, for example, by means of an electromagnetically induced magnetic field of the actuator. For this purpose, the actuator has at least one, and preferably a multiplicity of magnet coils which are connected to a control device by means of a control line. In combination with further preferably ferromagnetic components of the drive according to the invention, a predetermined magnetic field is built up in a controlled manner within the drive.

According to a further particularly preferred embodiment of a drive for a coolant pump, the electromagnetically actuatable devices are valves, in particular seat valves, which, according to a particularly preferred embodiment, have at least one return device.

According to a further particularly preferred embodiment, the electromagnetically actuatable device has at least one axially movable armature, on which a magnetic actuating force acts, in particular the electromagnetic actuating force induced by the actuator.

According to a further particularly preferred embodiment, the drive for a coolant pump has, in particular, two actuatable devices which, for example, in a contrary or oppositely directed manner open one flow path and close another flow path.

It is also within the scope of the present invention to provide a controllable device which opens or closes a plurality of flow paths of the drive. It is also within the scope of the present invention that the controllable device can assume a multiplicity of intermediate positions in order to control or regulate the volume flow of the viscous fluid as a function of at least one predetermined parameter.

According to a further particularly preferred embodiment, the actuator or parts of the actuator is/are arranged outside the rotating coupling or outside the drive. According to a further particularly preferred embodiment, the control of the fluid level in the coupling region between the drive member and the driven member is effected by means of a time-variable opening ratio of the controllable devices with respect to the flow paths.

Furthermore, according to a particularly preferred embodiment, in the rest position of the controllable device, the flow path in the coupling regions for the fluid is opened and the flow path for the fluid out of the coupling region is closed.

According to the present invention, in particular, the rest position is designated as the state in which no electromagnetic magnetic field is induced by the actuator.

According to a further particularly preferred embodiment, this rest position is brought about by means of a return device which, according to a further particularly preferred embodiment, is a return spring which is designed, for example, as a double-annular flat spring.

Such a return spring can bring about a return force by being moved out of the rest position, for example, by the application of an electromagnetic actuating force, in such a way that the change in position caused thereby tensions the return spring, in order that, when the magnetic field lapses, the controllable device, such as, for example, the tilting valve returns, to its rest position.

It is also within the scope of the present invention to use, instead of a double-annular return spring, other spring devices which, according to a further particularly preferred embodiment, maintain a predetermined return force on the controllable device even in the rest position of the controllable device.

According to a further particularly preferred embodiment, the return force is oriented in such a way that it acts in a direction away from the actuator, in particular from the coils of the latter.

According to a further particularly preferred embodiment, the drive for a coolant pump has at least one further flow path having no controllable device for varying the passage orifice of the flow path.

According to a further particularly preferred embodiment, the control of the electromagnetic device, in particular of the armature arranged on it, takes place by means of a pulse-width-modulated signal for controlling the actuator.

Particularly in order to provide an improved control or regulation of the electromagnetically controllable device, according to a further particularly preferred embodiment, the shaft of the drive and/or the shaft of the coolant pump has mounted on it a pulse generator which is provided for determining the rotational speed.

According to a further particularly preferred embodiment, the mounting of the drive takes place in the region above the bearing of the coolant pump.

According to a further particularly preferred embodiment, the drive for a coolant pump has a locking device, by means of which, in particular, the drive member and driven member can be connected positively and/or nonpositively. This device serves, in particular, for providing torque transmission between the drive member and driven member in the event of a possible failure of the drive.

Furthermore, the present invention also embraces an apparatus for operating a cooling system for a motor vehicle which has at least one coolant pump, a drive assembly and at least one drive according to the preceding description.

The scope of the present invention also embraces the use of a drive according to at least one of the preceding embodiments for operating a cooling system of a motor vehicle.

The invention is described in detail below by means of various preferred embodiments. However, the embodiments shown herein are not intended to restrict the scope of the present invention, but, on the contrary, indicate by way of example some preferred possibilities for designing a drive for a motor vehicle are covered by the invention.

Turning now to the drawings, in the drive according to the invention, illustrated in FIG. 1, for a water pump, the latter has an integrated fluid friction coupling which is subdivided, for example, into two regions. The first region is designed as a so-called coupling region 14, and is defined by the space in which the housing of the drive (comprised of the drive member 2, and the driven member 12 connected to the water pump shaft) can be connected in a coupleable manner for the transmission of a torque. This coupling region is formed preferably by a plurality of narrow labyrinthine gaps between the drive disk and the driven disk with the torque transmission being determined by a predetermined quantity of viscous fluid in the coupling region. The second region is a storage space or reservoir 13 in which the viscous fluid is held or stored that is not required at any given moment for torque transmission.

Between these two regions, which may lie on approximately the same diameter within the drive housing, a partition 34 is arranged, for example, which has a plurality of, and preferably two, valves 4, 5 which control or regulate the volume flow of the viscous fluid in at least one direction in each case.

FIG. 1 shows both the return-flow valve 4 and the inflow valve 5 which respectively open and close the flow path between the regions described above. Furthermore, the drive according to the exemplary embodiment illustrated here has a pump shaft 6, a pump impeller 8 and a pump housing 10. Furthermore, FIG. 1 shows the controllable device 3 activated via an actuator which has at least one magnet coil 11.

According to the embodiment illustrated here, the torque for the drive according to the invention is transmitted to the drive according to the invention via a belt pulley 9 and a drive assembly connected to the latter, and is introduced into the coupling region of the drive via the rotationally fixed connection.

With the inflow valve 5 open, as illustrated in FIG. 1, the coupling region is filled with viscous fluid and transmits the torque introduced via the pulley to the driven disk 12. The latter is rotationally fixedly connected to the pump shaft 6, so that the pump impeller 8 is set in rotation. The mounting of the belt pulley 9 and of the housing cover takes place via the bearing 17 which, according to the exemplary embodiment in FIG. 1, is arranged so as to be offset axially with respect to the pump shaft bearing 25.

In order to control of the level of the viscous fluid in the coupling region 14, which is needed for torque transmission, the opening ratio of the two valves 4 and 5 is variable with time. The actuation of the valves in this case takes place by means of at least one actuator which is preferably arranged outside of the rotating fluid friction coupling and has, in particular, magnet coils 11 anchored in a stationary manner.

The magnetic field generated when current is applied to the coils is conducted via ferromagnetic components of the coupling housing into the housing interior of the drive according to the invention, and there acts axially on a movable armature 3 of the electromagnetically controllable device. The armature itself, for example, by means of its axial movement, actuates the valves 4 and 5 of the drive via locally mounted tongues or levers and thereby brings about a filling or emptying of the coupling region 14.

According to a particularly preferred embodiment of the present invention, the valves are arranged in such a way with respect to the actuating movement induced by the armature 3, that in each case one valve is opened and the other is closed.

In order, furthermore, to ensure the operating reliability of a vehicle, in a preferred embodiment of the present invention the arrangement of the valves is selected such that the inflow valve 5 is open and the return-flow valve 4 is closed. In this case, the axially movable armature 3 is in a position spaced apart from the actuator of the drive according to the invention in the rest state of the actuator.

This position is also brought about, in particular, by a return spring 16 which, in addition to centering the preferably annular or segmental armature 3, also urges the latter, in the currentless state of the magnet coils 11, into a position which is remote with respect to the magnet coil. In this position, as a result of the centrifugal force, maximum viscous fluid is conveyed into the coupling region, so that the driven disk and consequently the water pump are driven at a predetermined rotational speed.

Furthermore, according to the exemplary embodiment illustrated in FIG. 1, magnetically nonconducting components or subassemblies 35 are interposed between the coil 11 and the armature 3, in order to conduct the magnetic flux in the drive along a predetermined path.

In the case of current being applied permanently to the magnet coils 11 (cf. FIG. 2), the armature is pulled up against the coil on account of the magnetic force acting on it and is pulled, counter to the return force of the return spring, into an opposite end position with respect to the rest position. In this position, according to the embodiment illustrated here, the inflow valve 5 is closed, so that no viscous fluid can flow into the coupling region 14. On the other hand, however, owing to the arrangement and switching of the valves, the return flow valve 4 is open in this switching position, so that the viscous fluid is pumped out of the coupling region 14 into the storage region 13 of the drive by means of a pumping-off device customary in fluid friction couplings.

As regards the functioning and design of such a pumping-off device or as regards the basic functioning of a fluid friction coupling, reference is made to DE (2002) 102 38 739.7, (corresponding to U.S. 2004/168877) which is hereby incorporated by reference in its entirety into the present application.

To obtain a minimum rotational speed of the water pump, according to one embodiment (not illustrated in detail) of the drive according to the invention, one or more working gaps, that is to say radially oriented flow paths, are arranged outside the pumping-off device, so that the coupling region is not emptied completely and, because a predetermined quantity of viscous fluid remains in the coupling region, a predetermined minimum torque for driving the water pump is maintained.

Figure 2:
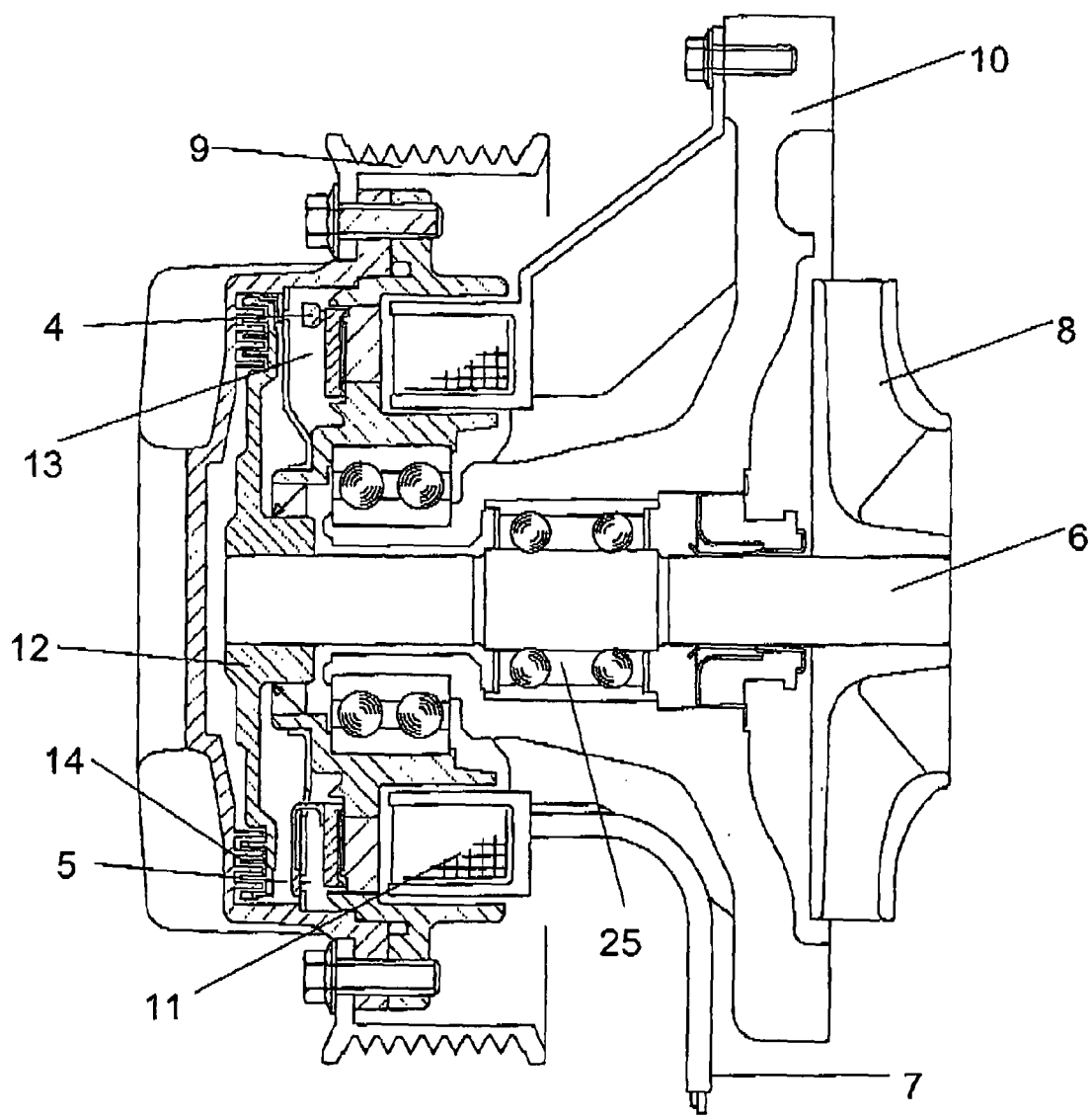
FIG. 2 is a cross-sectional illustration of the drive according to the invention for showing a water pump in a second switching position.

FIG. 2 shows the embodiment according to the invention of a regulatable drive according to FIG. 1, in the state in which current is applied to the magnet coils 11. In this case, the inflow valve 5 is closed and the return-flow valve 4 is open.

In order to achieve and control the required setting of the predetermined water pump rotational speed, a co-ordination of the switching characteristic of the valves and the co-operation of the opening ratios of the valves are created in the control. Thus, according to the invention, the functioning of the rotational speed regulation between a predetermined minimum and a predetermined maximum drive rotational speed occurs in that the armature of the controllable device is timed by means of a pulse-width-modulated signal at the magnet coils or magnet coil of the actuator and is thereby moved back or forth. The pulse-width-modulated signal thus determines the duty factor of the armature movement and thereby the time-related opening ratio of the two valves.

Figure 7:
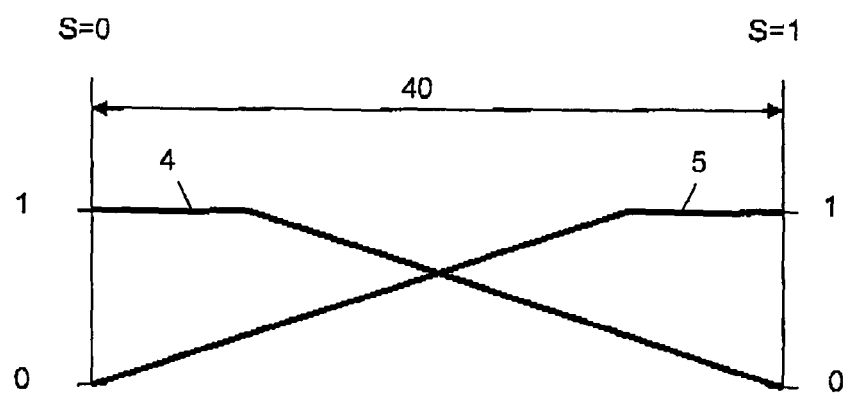
FIG. 7 is a functional diagram of the valve control of a drive according to the invention.

FIG. 7 illustrates the opening behavior of the valves 4 and 5 by means of a graph.

The armature 3 moves from a rest position into an actuating position, as a function of the application of current to the actuator. This armature movement may be gathered from the reference symbol 40 in the illustration of FIG. 7 with the position of the armature in the rest position, with no current applied to the actuator (s=0), being indicated on the left and that with current being applied to the actuator (s=1) being indicated on the right.

The lines 4 and 5 indicate the actuating position of the valves 4 and 5 between an open position 1 and a closed position 0. Thus, the inflow valve 4 is open in the state in which no current is applied to the actuator and is closed in the state in which current is applied. The same applies conversely to the position of the return-flow valve 5.

According to a particularly preferred embodiment of the drive according to the invention, the geometry of the valves and of the pumping-off device is designed in such a way that, for example, a duty factor of 60% application of current and 40% nonapplication of current to the magnet coils 11, with a clock frequency of, for example, 1 Hertz, brings about a reduction in the drive rotational speed of 40%.

Figure 4:
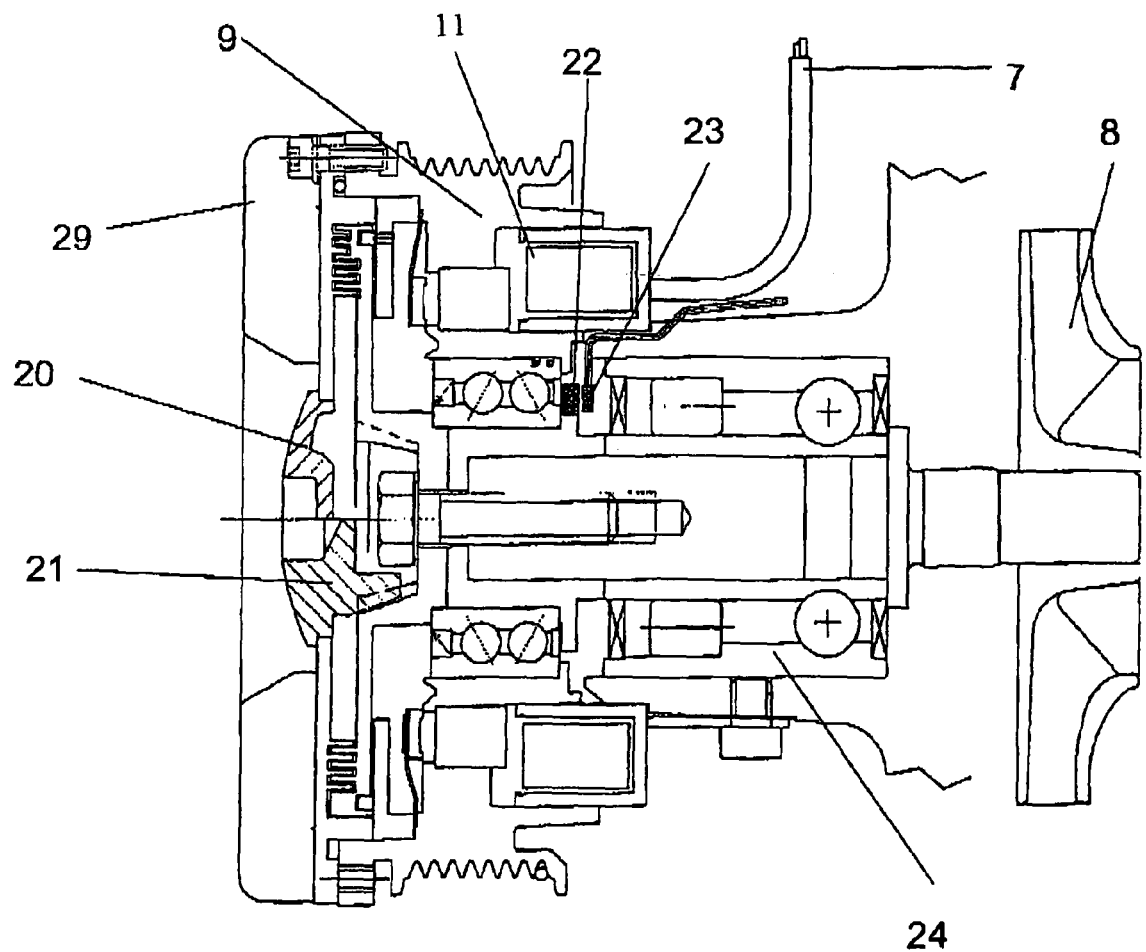
FIG. 4 is a cross-sectional view showing a further alternative embodiment of the drive according to the invention, having a locking device.

Furthermore, to improve the regulation quality or control quality of the drive according to the invention, this drive may have a rotational speed sensor. For this purpose, as illustrated in FIG. 4, a pulse generator 22 may be fastened to the pump shaft or to a part connected to the latter. The signal from which pulse generator is picked up by a rotational speed sensor 23 and can be transmitted to a control device. The sensor is expediently connected to the magnet coil 11, in order to preferably utilize the advantage of common electrical connections.

In the embodiment according to FIGS. 1 and 2, the coupling housing is supported via bearings, preferably rolling bearings, which are arranged directly on the pump housing. This results, inter alia, in the advantage that the pump shaft 6 together with the driven disk 12 and the pump impeller 8 itself are largely free of supporting forces which, for example, act on the belt pulley. The mounting can thereby be designed to be correspondingly lighter or simpler.

Figure 3:
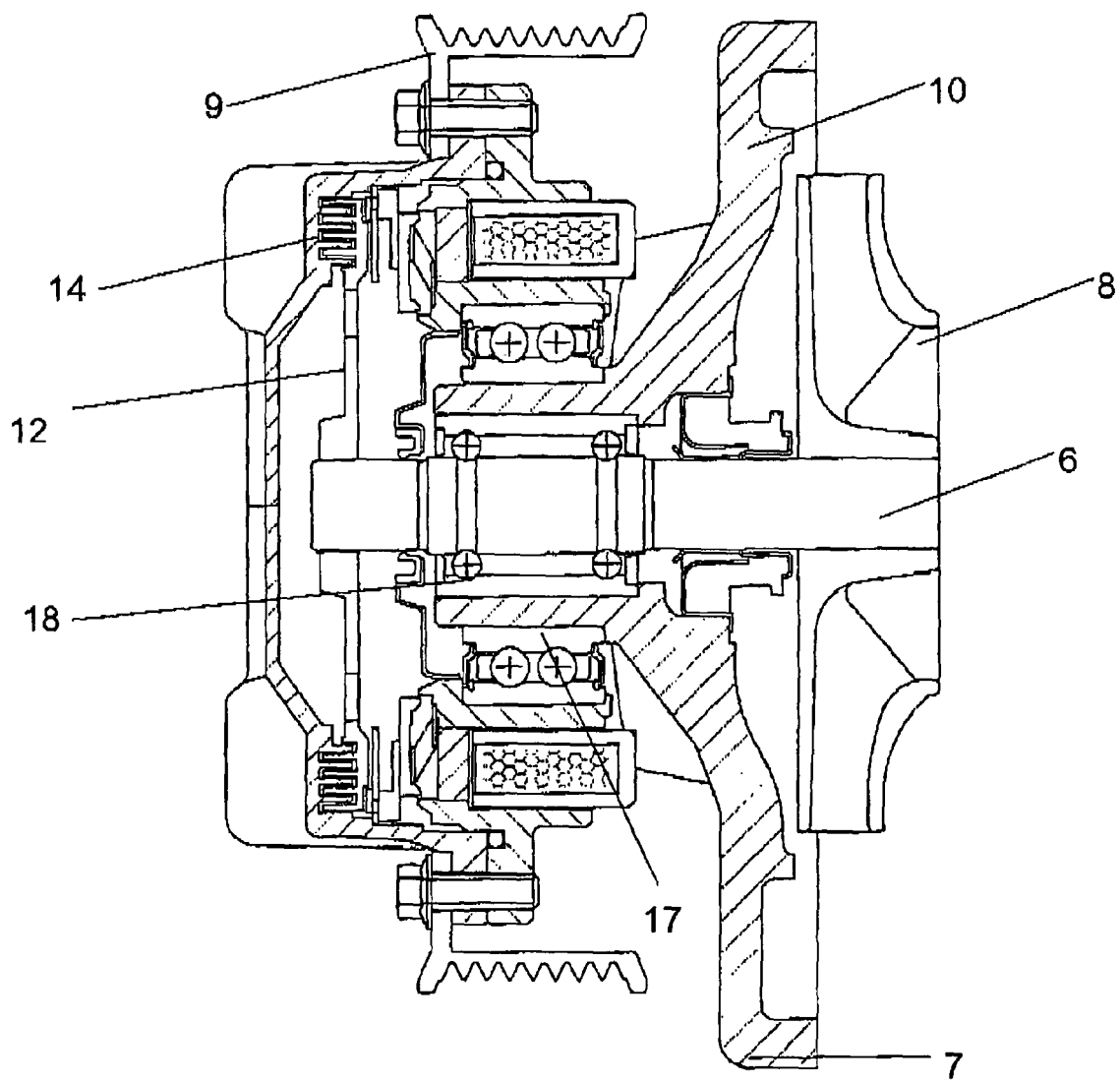
FIG. 3 is a cross-sectional view showing a further alternative embodiment of the drive according to the invention.

FIG. 3 shows an alternative embodiment of the drive according to the invention, in which the bearings 18 for the pump impeller and the bearings 17 for the belt pulley or the housing cover are arranged so as to be placed one above the other, with the result that the overall length of the drive according to the invention can be reduced.

However, placing the two bearings one above the other provides an advantage even when at least one predetermined region of the bearing is arranged above at least one region of the other bearing.

In the alternative embodiment, illustrated in FIG. 4, the regulatable drive according to the invention is arranged as a separate unit on a water pump. Advantageously, in such a case, the shaft of the water pump is used for mounting the drive according to the invention.

According to the exemplary embodiment illustrated in FIG. 4, the drive device according to the invention may have a locking device. In the event of a possible failure of the fluid friction coupling, a preferably nonpositive connection is made between the driven coupling housing or drive member and the driven disk. For this purpose, the front-side housing cover has a closeable orifice 20, into which can be inserted an insert 21 which makes a positive and/or nonpositive connection with the pump shaft via the drive member and driven member.

Figure 5:
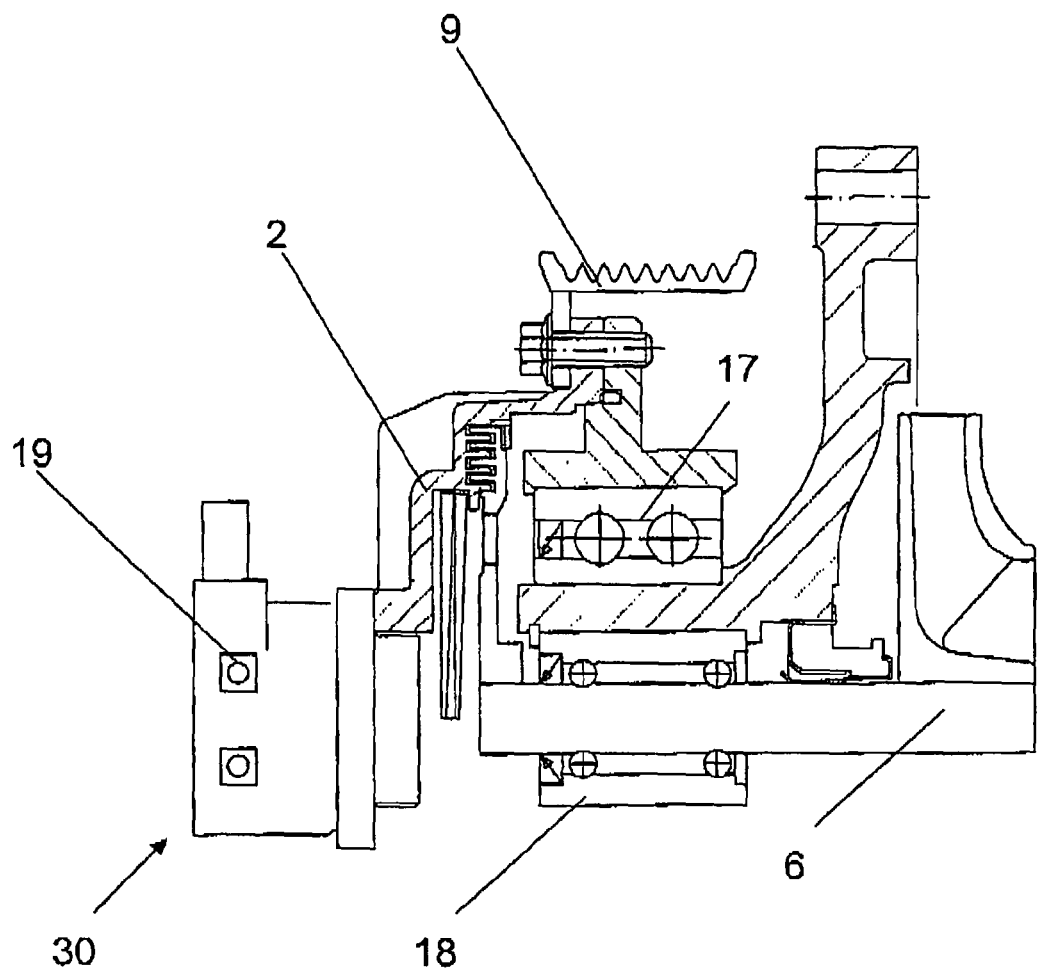
FIG. 5 is a diagrammatic illustration of an alternative embodiment of the drive according to the invention.

FIG. 5 illustrates a further embodiment of the drive according to the invention, in which the actuator is arranged on the front side of the drive. The mounting of the actuator 30 takes place via the bearing 19 which is supported on the rotating coupling part.

Figure 6:
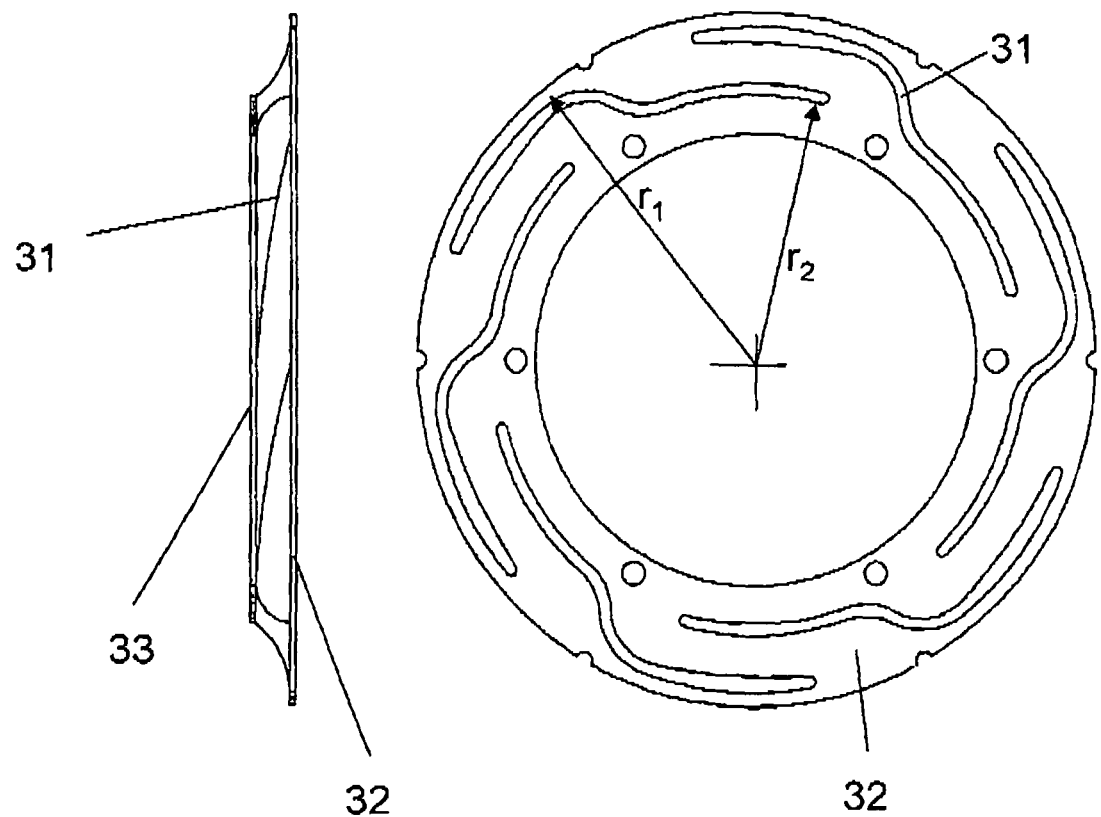
FIG. 6 is a plan view and a side view showing a return device for a drive according to the invention.

FIG. 6 shows a return spring for the drive according to the invention. The return spring urges the controllable device preferably into its rest position. In this case, the return spring may be designed as one part and, according to the embodiment illustrated in FIG. 6, it consists essentially of two concentric rings 32, 33 which are connected by means of a plurality of individual arms and/or lamellae 31. These resilient lamellae are distributed essentially uniformly over a predetermined radius of the rings and are oriented at a low angle to the tangent to the inner ring 33 of the return spring. Furthermore, they preferably do not extend over a constant radius, but, instead, have a bent shape extending over a predetermined radius section r1-r2 of the rings.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A regulatable drive for driving a coolant pump in a motor vehicle, comprising:
    a rotatably mounted shaft;
    a driven member mounted rotationally fixedly on the shaft;
    a drive member mounted rotatably on the shaft, with the drive member and driven member defining therebetween a coupling region for receiving a viscous fluid;
    at least one first flow path and at least one second flow path connecting a fluid storage space to the coupling region;
    a first selectively actuatable device for varying a passage orifice of the first flow path with a first axially movable armature; and
    a second selectively actuatable device for varying a passage orifice of the second flow path with a second axially movable armature,
    wherein the first and second armatures are configured to operate by simultaneously moving in a same direction such that the first flow path is opened and the second flow path is closed when the first and second armatures simultaneously move in a first direction, and the first flow path is closed and the second flow path is opened when the first and second armatures simultaneously move in a second direction.

2. The regulatable drive according to claim 1, wherein the coupling region is formed essentially by opposing concentric profile structures engaging one in the other, the profile structures being arranged on at least one side of the driven member and of the drive member in each case.

3. The regulatable drive according to claim 1, further comprising a device for producing a magnetic field for electromagnetically actuating the first and second actuatable devices.

4. The regulatable drive according to claim 3, wherein control of the first and second actuatable devices electromagnetically takes place by a pulse-width modulated signal.

5. The regulatable drive according to claim 3, wherein each of the first and second actuatable devices are valves formed from the respective actuatable device's armature and at least one return device.

6. The regulatable drive according to claim 5, wherein the return device comprises a return spring.

7. The regulatable drive according to claim 5, wherein the return device comprises a double-annular return spring.

8. The regulatable drive according to claim 5, wherein the return device brings about a return force which is directed away from coils of the first and second actuatable devices.

9. The regulatable drive according to claim 1, wherein a magnetic actuating force acts on the first and second armatures.

10. The regulatable drive according to claim 1, wherein each of the actuatable devices is arranged outside a rotating coupling.

11. The regulatable drive according to claim 1, wherein the actuatable devices control fluid level in the coupling region by a time-variable opening ratio.

12. The regulatable drive according to claim 1, wherein the first and second actuatable devices have a rest position in which the first flow path into the coupling region for the fluid is opened and the second flow path out of the coupling region for the fluid is closed.

13. The regulatable drive according to claim 1, further comprising a pulse generator for determining a rotational speed of the shaft, wherein the pulse generator is provided on the shaft.

14. The regulatable drive according to claim 1, further comprising a mounting structure for the drive arranged above a region for receiving a coolant pump bearing.

15. The regulatable drive according to claim 1, further comprising a locking device for selectively connecting the drive member and driven member.

16. An apparatus for operating a cooling system of a motor vehicle, comprising:
   at least one coolant pump; and
   a drive assembly,
   wherein the drive assembly comprises a drive,
   wherein the drive comprises:
      a rotatably mounted shaft;
      a driven member mounted rotationally fixedly on the shaft;
      a drive member mounted rotatably on the shaft, with the drive member and driven member defining therebetween a coupling region for receiving a viscous fluid;
      at least one first flow path and at least one second flow path connecting a fluid storage space to the coupling region;
      a first selectively actuatable device for varying a passage orifice of the first flow path with a first axially movable armature; and
      a second selectively actuatable device for varying a passage orifice of the second flow path with a second axially movable armature, and
      wherein the first and second armatures are configured to operate by simultaneously moving in a same direction such that the first flow path is opened and the second flow path is closed when the first and second armatures simultaneously move in a first direction, and the first flow path is closed and the second flow path is opened when the first and second armatures simultaneously move in a second direction.

17. A method for operating a cooling system for a motor vehicle, comprising:
   driving a water pump with a drive,
   wherein the drive comprises:
      a rotatably mounted shaft;
      a driven member mounted rotationally fixedly on the shaft;
      a drive member mounted rotatably on the shaft, with the drive member and driven member defining therebetween a coupling region for receiving a viscous fluid;
      at least one first flow path and at least one second flow path connecting a fluid storage space to the coupling region;
      a first selectively actuatable device for varying a passage orifice of the first flow path with a first axially movable armature; and
      a second selectively actuatable device for varying a passage orifice of the second flow path with a second axially movable armature, and wherein the first and second armatures are configured to operate by simultaneously moving in a same direction such that the first flow path is opened and the second flow path is closed when the first and second armatures simultaneously move in a first direction, and the first flow path is closed and the second flow path is opened when the first and second armatures simultaneously move in a second direction.

\* \* \* \* \*